(12) United States Patent
Ellsworth

(10) Patent No.: US 11,757,814 B2
(45) Date of Patent: Sep. 12, 2023

(54) MEDIA SHARING APPLICATION

(71) Applicant: Isaac Ellsworth, Vineyard, UT (US)

(72) Inventor: Isaac Ellsworth, Vineyard, UT (US)

(*) Notice: Subject to any disclaimer, the term of this patent is extended or adjusted under 35 U.S.C. 154(b) by 0 days.

(21) Appl. No.: 16/856,975

(22) Filed: Apr. 23, 2020

(65) Prior Publication Data

US 2020/0344190 A1 Oct. 29, 2020

Related U.S. Application Data

(60) Provisional application No. 62/839,739, filed on Apr. 28, 2019.

(51) Int. Cl.
*H04L 51/10* (2022.01)
*G06F 16/44* (2019.01)
*G06F 16/438* (2019.01)

(52) U.S. Cl.
CPC .......... *H04L 51/10* (2013.01); *G06F 16/4387* (2019.01); *G06F 16/44* (2019.01)

(58) Field of Classification Search
CPC ....... H04L 67/06; H04L 9/0816; H04L 45/70; H04L 67/1044; H04L 67/327; H04L 63/061; H04L 9/14; H04L 9/30; H04L 2209/603; G06F 21/10; H04N 21/23473; H04N 21/2393; H04N 21/2541; H04N 21/26606
USPC ....................................................... 709/230
See application file for complete search history.

(56) References Cited

U.S. PATENT DOCUMENTS

| | | | |
|---|---|---|---|
| 7,970,922 B2 | 6/2011 | Svendsen | |
| 10,043,500 B2 | 8/2018 | Quattro et al. | |
| 2006/0008256 A1* | 1/2006 | Khedouri | G06F 16/4387 386/234 |
| 2006/0143236 A1* | 6/2006 | Wu | G11B 27/034 |
| 2014/0005813 A1* | 1/2014 | Reimann | G06F 3/16 700/94 |
| 2014/0041051 A1* | 2/2014 | Meketa | G06F 21/10 726/28 |
| 2014/0233638 A1* | 8/2014 | Tu | H04N 19/46 375/240.03 |
| 2015/0065172 A1* | 3/2015 | Do | H04W 12/08 455/456.3 |
| 2019/0155997 A1* | 5/2019 | Vos | G06F 21/105 |
| 2019/0370280 A1* | 12/2019 | Shenoy | G06F 16/4387 |

OTHER PUBLICATIONS

U.S. Appl. No. 62/679,821, filed Jul. 2018, Shenoy; Arvind S.*

* cited by examiner

*Primary Examiner* — Tan Doan
(74) *Attorney, Agent, or Firm* — F. CHAU & ASSOCIATES, LLC

(57) ABSTRACT

The present disclosure relates to a media sharing application. The media sharing application may include a creator, player, and user function. The media sharing apparatus may include a processor, a memory, a playlist component, a sharing component, and a media access component. The playlist component plays media, provides the user with the ability to make a playlist, create artwork for the playlist, and include personal text and audio messages. The sharing component shares the playlist with another user or users. The media access component provides the media sharing application with media from various sources.

20 Claims, 10 Drawing Sheets

MEDIA SHARING APPLICATION

CROSS REFERENCES

This application claims priority to, and the benefit of, U.S. Provisional Application Ser. No. 62/839,739 filed on Apr. 28, 2019, entitled Mix-Tape App. The entire contents of the foregoing application are hereby incorporated by reference for all purposes.

BACKGROUND

The following relates generally to media sharing, and more specifically to application for sharing media from a third-party media service.

Media applications provide music, radio shows, or other audible media to a user. Media can be listened to on mobile phones, tablets, and computers. Sharing media with friends and family can be performed through a media application.

Third-party media applications may not provide easy access to media data through the media application. Additionally, sharing media across multiple platforms is difficult as different media platforms are not connected. Physical location may also limit sharing of media.

Therefore, there is a need in the art for a media sharing application to access data of third-party media applications to provide sharing of media across platforms and locations.

SUMMARY

A method, apparatus, and non-transitory computer-readable medium for sharing media from a third-party media service are described. Embodiments of the method, apparatus, and non-transitory computer-readable medium may generate a playlist comprising a plurality of media items and a catalog identifier corresponding to each of the media items, wherein each of the catalog identifiers corresponds to a third-party media application, transmit the playlist to a recipient, and access one or more of the media items based on the corresponding catalog identifiers using firmware for the corresponding third-party media application.

DETAILED DESCRIPTION

The present disclosure relates to a media application for electronic devices. More specifically, to a media sharing application to create and share playlists across platforms. Embodiments of the present disclosure may be used in various media service applications. As such, the media sharing application may access data from a third-party application and share the data to other uses with permissions and/or access to the same media.

Figure 1:
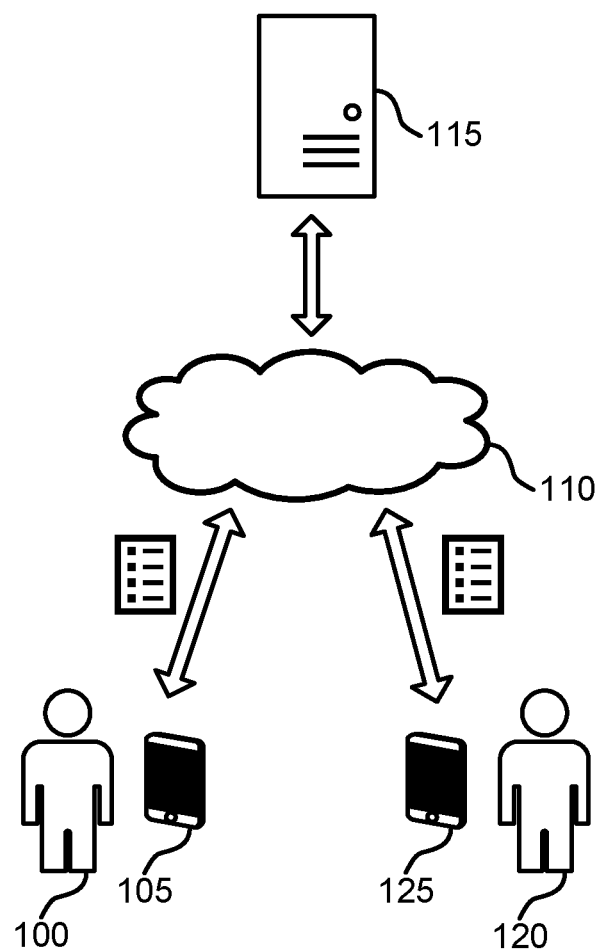
FIG. 1 shows an example of a media sharing system according to aspects of the present disclosure.

FIG. 1 shows an example of a media sharing system according to aspects of the present disclosure. The example shown includes first user 100, first user device 105, network 110, server 115 second user 120, and second user device 125.

A first user 100 using a first user device 105 creates a playlist and sends the playlist to a second user 115 using a second user device 120. Sending of a playlist is performed through a network 110 and server 1. In an exemplary embodiment, the playlist may have personal recordings and messages from a user, and artwork may be created for the playlist.

Recoding applications do not allow other parties to access a database directly through an application. The media sharing application of the present disclosure accesses various application databases, providing a process to play, save, and share media with people across different regions around the world. Below are example codes, showing the process the system uses to generate playlists, transmit and receive playlists, and access third-party media applications for media sources. The present disclosure is not limited thereto.

```
fun methodForCheckSubscription( ){
    SKCloudServiceController( ).requestCapabilities{ (capability:SKCloudServiceCapability,
err:Error?) in
        guard err == nil else {
            print("error in capability check is \(err!)")
            if UserDefaults.standard.value(forKey: "apple") == nil{
                UserDefaults.standard.setValue("hello", forKey: "apple")
            }else{
                self.PermissionAlert(message: "Mix-Tape Would Like to Access Apple Music,
your music and video activity and your media library")
            }
            return
        }
        if capability.contains(SKCloudServiceCapability.musicCatalogPlayback) {
            print("user has Apple Music subscription")
        }
        if
capability.contains(SKCloudServiceCapability.musicCatalogSubscriptionEligible) {
            print("user does not have subscription")
            DispatchQueue.main.async {
```

```
            if let url = URL(string:
"https://itunes.apple.com/subscribe?app=music&at=1010134Vy&ct=app=music") {
                    if #available(iOS 10, *) {
                        UIApplication.shared.open(url, options: [:], completionHandler: nil)
                    } else {
                        UIApplication.shared.openURL(url)
                    }
                }
                    }
            }
        }
    }
```

Example Code 1

Figure 2:
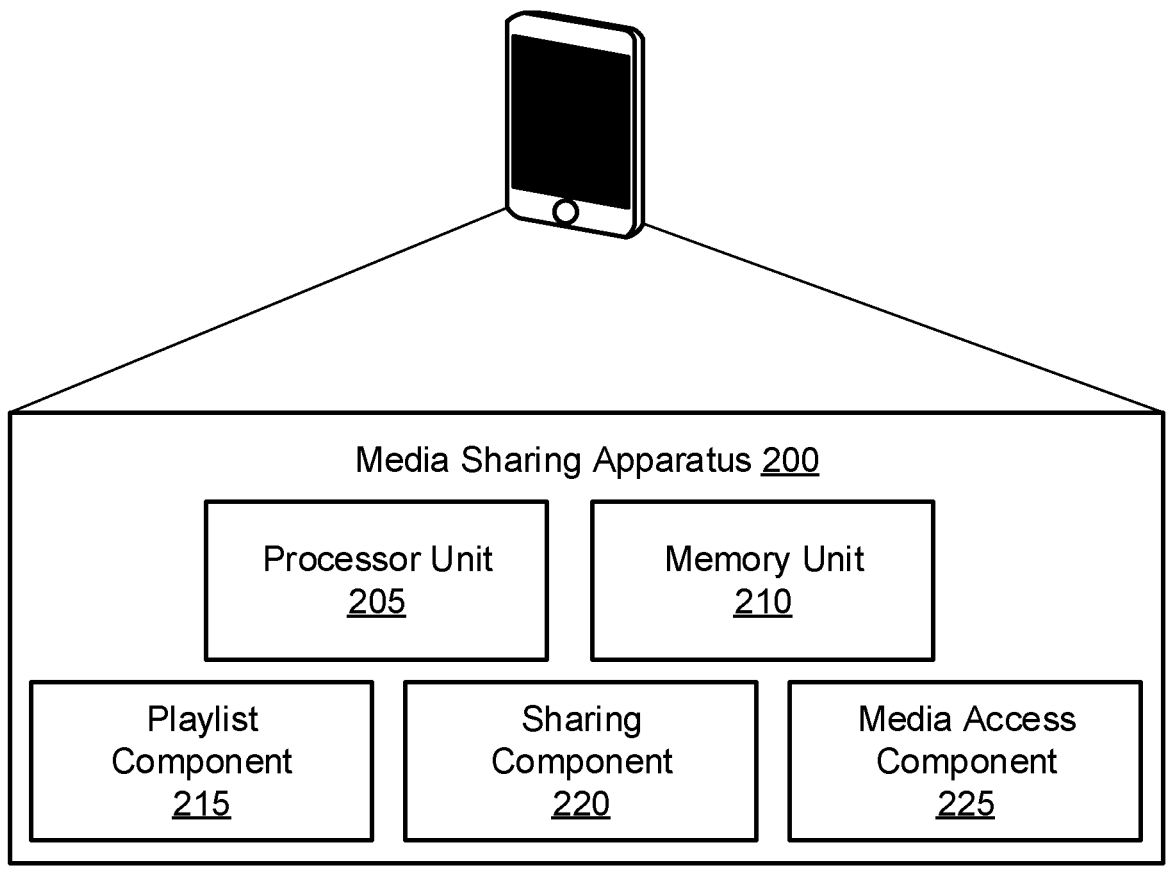
FIG. 2 shows an example of a media sharing apparatus according to aspects of the present disclosure.

FIG. 2 shows an example of a media sharing apparatus 200 according to aspects of the present disclosure. Media sharing apparatus 200 may include a processor unit 205, memory unit 210, playlist component 215, sharing component 220, and media access component 225.

A processor unit 205 may include an intelligent hardware device, (e.g., a general-purpose processing component, a digital signal processor (DSP), a central processing unit (CPU), a graphics processing unit (GPU), a microcontroller, an application-specific integrated circuit (ASIC), a field-programmable gate array (FPGA), a programmable logic device, a discrete gate or transistor logic component, a discrete hardware component, or any combination thereof). In some cases, the processor may be configured to operate a memory array using a memory controller. In other cases, a memory controller may be integrated into the processor. The processor may be configured to execute computer-readable instructions stored in a memory to perform various functions. In some examples, a processor may include special-purpose components for modem processing, baseband processing, digital signal processing, or transmission processing. In some examples, the processor may comprise a system-on-a-chip.

A memory unit 210 may store information for various programs and applications on a computing device. For example, the storage may include data for running an operating system. The memory may include both volatile memory and non-volatile memory. Volatile memory may include random access memory (RAM), and non-volatile memory may include read-only memory (ROM), flash memory, electrically erasable programmable read-only memory (EEPROM), digital tape, a hard disk drive (HDD), and a solid-state drive (SSD). The memory may include any combination of readable and/or writable volatile memories and/or non-volatile memories, along with other possible storage devices.

Playlist component 215 may generate a playlist including a set of media items and a catalog identifier corresponding to each of the media items, where each of the catalog identifiers corresponds to a third-party media application. Playlist component 215 may also receive input from a user identifying each of the media items, where the playlist is generated based on the input. Playlist component 215 may also receive an audio file, where the playlist includes the audio file.

Sharing component 220 may transmit the playlist to a recipient. Sharing component 220 may also identify a location of the recipient. Sharing component 220 may also identify a catalog region based on the location. Sharing component 220 may also identify at least one of the catalog identifiers based on the catalog region. Sharing component 220 may also transmit the audio file to the recipient along with the playlist.

Media access component 225 may access one or more of the media items based on the corresponding catalog identifiers using firmware for the corresponding third-party media application. In some examples, the third-party media application corresponding to each of the catalog identifiers includes a media application for a mobile electronic device, and the firmware includes firmware for operating the third-party media application on the mobile electronic device. In some examples, the third-party media applications corresponding to the catalog identifiers include at least two third-party media applications. In some examples, the set of media items include a music item, a video, an image, or any combination thereof. Media access component 225 may also verify that the recipient is authorized to access the one or more of the media items, where accessing the one or more of the media items is based on the verification.

Figure 3:
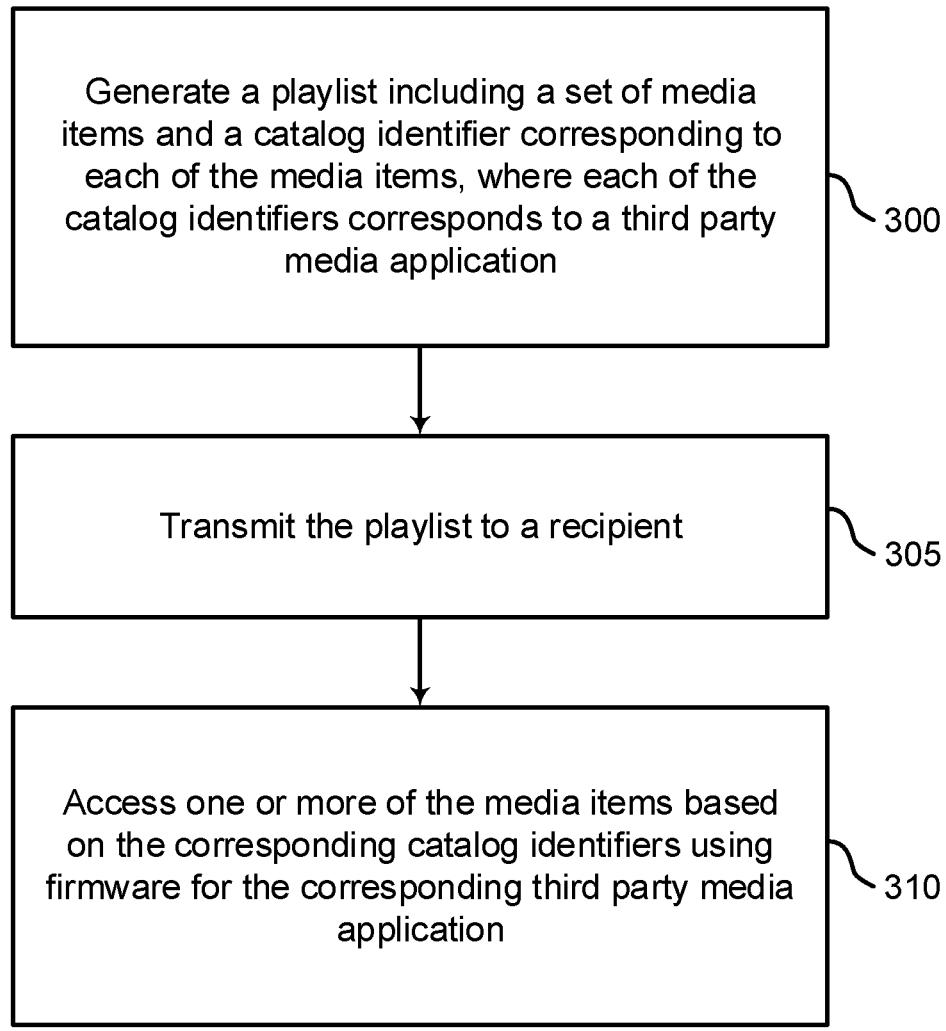
FIG. 3 shows an example of a process for sharing media according to aspects of the present disclosure.

FIG. 3 shows an example of a process for sharing media according to aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various sub-steps, or may be performed in conjunction with other operations described herein.

At operation 300, the system generates a playlist including a set of media items and a catalog identifier corresponding to each of the media items, where each of the catalog identifiers corresponds to a third-party media application. In some cases, the operations of this step may refer to, or be performed by, a playlist component as described with reference to FIG. 2. The playlist generated may contain, for example, music, radio shows, or audible clips created by the sending user.

At operation 305, the system transmits the playlist to a recipient. In some cases, the operations of this step may refer to, or be performed by, a sharing component as described with reference to FIG. 2. The system may choose a recipient with use of a friend list 1015, contact list 1020, or social media list, described with reference to FIG. 10.

At operation 310, the system accesses one or more of the media items based on the corresponding catalog identifiers using firmware for the corresponding third-party media application. In some cases, the operations of this step may refer to, or be performed by, a media access component as described with reference to FIG. 2. Access to third-party media is performed automatically, without active control from the user. The user inputs the name of the media file and the media sharing application of the present disclosure provides a list of selectable options to the user.

Figure 4:
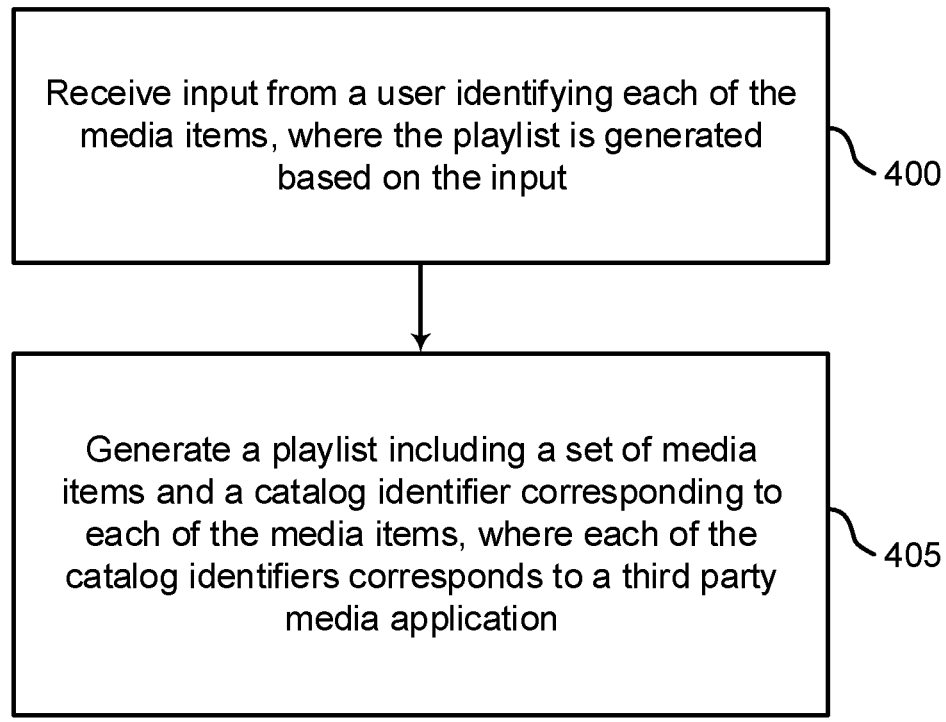
FIG. 4 shows an example of a process for generating a playlist according to aspects of the present disclosure.

FIG. 4 shows an example of a process for generating a playlist according to aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various sub-steps, or may be performed in conjunction with other operations described herein.

At operation 400, the system receives input from a user identifying each of the media items, where the playlist is generated based on the input. In some cases, the operations of this step may refer to, or be performed by, a playlist component as described with reference to FIG. 2. The playlist is generated when a user selects one or more media files to input into the playlist.

At operation 405, the system generates a playlist including a set of media items and a catalog identifier corresponding to each of the media items, where each of the catalog identifiers corresponds to a third-party media application. In some cases, the operations of this step may refer to, or be performed by, a playlist component as described with reference to FIG. 2. The playlist generated may contain, for example, music, radio shows, or audible clips created by the sending user.

Figure 5:
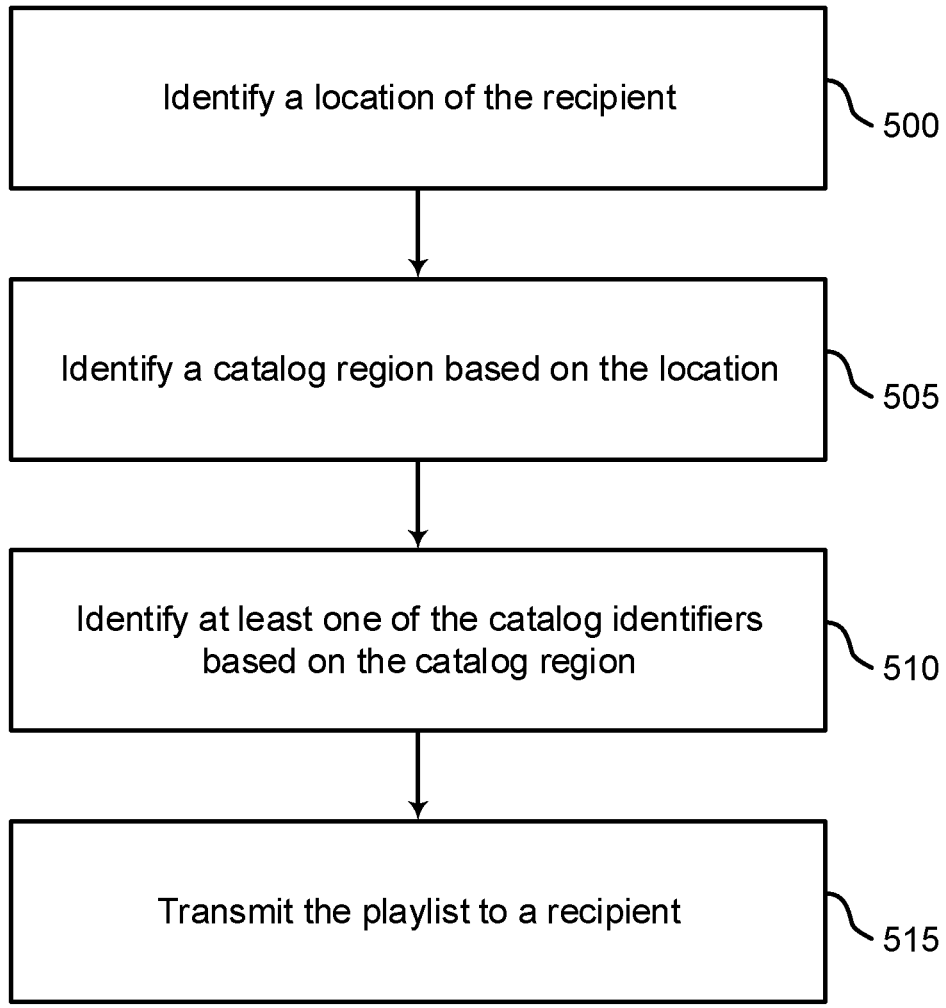
FIG. 5 shows an example of a process for sharing a playlist according to aspects of the present disclosure.

FIG. 5 shows an example of a process for sharing a playlist according to aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various sub-steps, or may be performed in conjunction with other operations described herein.

Media are confined by region location. The third-party applications limit the distribution of a media by denoting different regions around the world. For example, Apple Music has a specific region for North America and Europe. Each location provides different permissions for different media. The media sharing application can homogenize different locations so a media can be shared across regions. The homogenization processes all region identifiers to all of a user's libraries. For example, if a user from North America sends a North American identified media to a user in Europe, the coding provides the user in North America the ability to send the media with all region identifiers. As a result, the user may share a media or playlist with another user across regions. Below is an example code. The present disclosure is not limited, thereto.

```
@IBAction func action_sendNow(_ sender: Any) {
    self.viewModel.updateUserId(input: Singleton.shared.userData.user_id ?? "")
    if txtView.text == "Enter Personalized Message"{
        self.viewModel.updateMessage(input: "")
    }else{
        self.viewModel.updateMessage(input: self.txtView.text!)
    }
    if self.draftData == nil{
        if viewModel.isValid{
            // self.viewModel.updatePlaylistId(input: self.playlistId!)
            if self.songUrl != nil{
                self.viewModel.updateSongUrl(input: self.songUrl!)
            }else{
                self.viewModel.updateSongUrl(input: "")
            }
            self.viewModel.updateIsColor(input: self.isColor!)
            self.viewModel.updateSenderUsername(input: Singleton.shared.userData.userName ?? "")
            if Connectivity.isConnectedToInternet( ) {
                showHud("")
                self.sendNow_button.isUserInteractionEnabled = false
                viewModel.connectionRequestForSendSongs(withCompletion: { response,error in
                    if error == ""{
                        // self.methodForCreatdeveloperTokenAndGetPlaylist( )
                        let vc = self.storyboard?.instantiateViewController(withIdentifier: "Mix_TapeSentSuccessVC") as! Mix_TapeSentSuccessVC
                        vc.songArray = self.songArray
                        vc.artworkName = self.artWorkString!
                        if self.draftData != nil{
                            vc.draft = true
                        }else{
                            vc.draft = false
                        }
                        // self.hidesBottomBarWhenPushed = true
                        self.navigationController?.pushViewController(vc, animated: true)
                        self.tabBarController?.tabBar.isHidden = true
                    }else{
                        self.sendNow_button.isUserInteractionEnabled = true
                        showAlert("", message: error, onView: self)
                    }
                })
            }
        }else{
            let item = self.viewModel.brokenRules[0]
```

```
                print( item.message)
                showAlert("", message: item.message, onView: self)
            }
        }else{
            if self.songUrl != nil{
                self.viewModel.updateSongUrl(input: self.songUrl!)
            }else{
                self.viewModel.updateSongUrl(input: "")
            }
            self.viewModel.updateIsColor(input: self.isColor!)
            self.viewModel.updateSenderUsername(input:
Singleton.shared.userData.userName ?? "")
            if Connectivity.isConnectedToInternet( ) {
                showHud("")
                viewModel.connectionRequestForSendDraftSongs(withCompletion: {
response,error in
                    if error == ""{
                        // self.methodForCreatdeveloperTokenAndGetPlaylist( )
                        let vc = self.storyboard?.instantiateViewController(withIdentifier:
"Mix_TapeSentSuccessVC") as! Mix_TapeSentSuccessVC
                        vc.songArray = self.songArray
                        vc.artworkName = self.artWorkString!
                        if self.draftData != nil{
                            vc.draft = true
                        }else{
                            vc.draft = false
                        }
                        self.navigationController?.pushViewController(vc, animated: true)
                    }else{
                        self.sendNow_button.isUserInteractionEnabled = true
                        showAlert("", message: error, onView: self)
                    }
                })
            }
        }
    }
```

Example Code 2

At operation 500, the system identifies a location of the recipient. In some cases, the operations of this step may refer to, or be performed by, a sharing component as described with reference to FIG. 2. The recipient is selected by the user.

At operation 505, the system identifies a catalog region based on the location of the recipient. In some cases, the operations of this step may refer to, or be performed by, a sharing component as described with reference to FIG. 2. The catalog region may be determined based on the user's physical location as described by the user's device, the location of the service provider, or a global positioning system (GPS)_location, if the recipient has location services turned on, but the present disclosure is not limited thereto.

At operation 510, the system identifies at least one of the catalog identifiers based on the catalog region. In some cases, the operations of this step may refer to, or be performed by, a sharing component as described with reference to FIG. 2. Additionally, the recipient's system may determine the correct catalog identifier based on the recipient's location.

At operation 515, the system transmits the playlist to a recipient. In some cases, the operations of this step may refer to, or be performed by, a sharing component as described with reference to FIG. 2. The recipient may choose to play the playlist or save the playlist.

Figure 6:
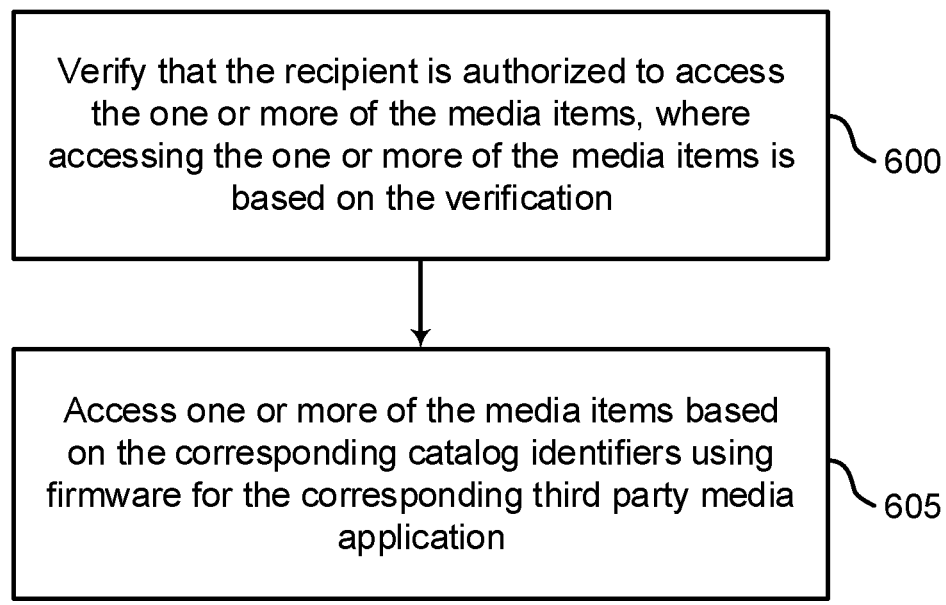
FIG. 6 shows an example of a process for accessing shared media according to aspects of the present disclosure.

FIG. 6 shows an example of a process for accessing shared media according to aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various sub-steps, or may be performed in conjunction with other operations described herein.

At operation 600, the system verifies that the recipient is authorized to access the one or more of the media items, where accessing the one or more of the media items is based on the verification. In some cases, the operations of this step may refer to, or be performed by, a media access component as described with reference to FIG. 2. The system will reject access to the one or more media items if the recipient is not authorized.

At operation 605, the system accesses one or more of the media items based on the corresponding catalog identifiers using firmware for the corresponding third-party media application. In some cases, the operations of this step may refer to, or be performed by, a media access component as described with reference to FIG. 2. Access to third-party media is performed automatically, without active control from the user. The user inputs the name of the media file and the media sharing application of the present disclosure provides a list of selectable options to the user.

In one embodiment of the preset disclosure, the media sharing application accesses a database of media with a 'backdoor' feature. The present disclosure requests verification of a subscription to a third-party data sharing application, used to add media to a sharable list. Account permissions are then provided from the third-party application to the media sharing application. The permissions are then authenticated, and a user may access media and share a sharable list with other users. Below are example codes. The present disclosure is not limited thereto.

```
@IBAction func action_search_Button(_ sender: Any) {
        guard Connectivity.isConnectedToInternet( ) else {
            showAlert("", message: "Internet not available", onView: self)
            return
        }
        self.viewModel.updateMusicType(input: self.musicType!)
        self.viewModel.connectionRequestForGetSearchList(withCompletion: { response,
error in
            if error == ""{
                    self.filterSongListArray.removeAll( )
                    self.filterSongListArray = response
                    if self.filterSongListArray.count > 0{
                            self.msg_label.isHidden = true
                            self.msg2_label.isHidden = true
                    }else{
                            self.msg_label.isHidden = false
                            self.msg2_label.isHidden = false
                            self.filterSongListArray.removeAll( )
                    }
                    self.flagArray.removeAllObjects( )
                    for _ in response{
                        self.flagArray.add("0")
                            self.songFlat.add("0")
                    }
                    self.tblView.reloadData( )
            }else{
                showAlert("", message: "No Results", on View: self)
            }
        })
    }
fileprivate func fetchEpisodes( ) {
    guard let feedUrl = podcast?.feedUrl else { return }
    APIService.shared.fetchEpisodes(feedUrl: feedUrl) { [weak self] (episodes) in
        guard let `self` = self else { return }
        self.episodes = episodes
            self.flagArray.removeAllObjects( )
            for _ in episodes{
                self.flagArray.add("0")
//                self.songFlat.add("0")
            }
        DispatchQueue.main.async {
            self.tableView.reloadData( )
        }
    }
}
```

Example Code 3

In another embodiment, the media sharing application may search multiple databases for a specific media. A user may search for a media in a user interface search bar. A list of media is presented to a user and the user may play and/or share the specific record with other users. For example, a user may search for a media in the user interface (UI) of the media sharing application. The application then presents the user with a list of media, matching the search criteria, from various platforms such as Apple Music, Spotify, Apple Podcasts, etc. Below are example codes. The present disclosure is not limited thereto.

```
@IBAction func didPressPlayPauseButton(_ sender: AnyObject) {
    if songListData != nil{
        self.uriStr = songListData?.song_apple_id ?? ""
        if !(appRemote.isConnected) {
                if (!appRemote.authorizeAndPlayURI(self.uriStr!)) {
                    // The Spotify app is not installed, present the user with an App Store page
                    showAppStoreInstall( )
                }
                self.playPauseButton.setImage(UIImage(named: "pause"), for: .normal)
        } else if self.updatePlayButton == "pause" { // playerState == nil ||
playerState!.isPaused
                startPlayback( )
                self.updatePlayButton = "play"
        } else {
            pausePlayback( )
            self.updatePlayButton = "pause"
        }
    }else{
        if !(appRemote.isConnected) {
            if (!appRemote.authorizeAndPlayURI(self.uriStr!)) {
                // The Spotify app is not installed, present the user with an App Store page
                showAppStoreInstall( )
            }
```

```
            self.playPauseButton.setImage(UIImage(named: "pause"), for: .normal)
        } else if self.updatePlayButton == "pause" { // playerState == nil ||
playerState!.isPaused
            startPlayback( )
            self.updatePlayButton = "play"
        } else {
            pausePlayback( )
            self.updatePlayButton = "pause"
        }
    // appRemote.authorizeAndPlayURI(songsListArray?.track_uri ?? "")
    }
}
```

Example Code 4

Firmware is a software that provides control for a specific hardware. The media sharing application does not connect directly to third-party applications. Rather, the connection is to the firmware of the third-party application, which provides access to the information used in third-party applications. Below are example codes. The present disclosure is not limited thereto.

```
@IBAction func spotifyMusicandPodcast(_ sender: AnyObject) {
    if songListData != nil{
        self.uriStr = songListData?.song_apple_id ?? ""
        if !(appRemote.isConnected) {
            if (!appRemote.authorizeAndPlayURI(self.uriStr!)) {
                // The Spotify app is not installed, present the user with an App Store page
                showAppStoreInstall( )
            }
            self.playPauseButton.setImage(UIImage(named: "pause"), for: .normal)
        } else if self.updatePlayButton == "pause" { // playerState == nil ||
playerState!.isPaused
            startPlayback( )
            self.updatePlayButton = "play"
        } else {
            pausePlayback( )
            self.updatePlayButton = "pause"
        }
    }else{
        if !(appRemote.isConnected) {
            if (!appRemote.authorizeAndPlayURI(self.uriStr!)) {
                // The Spotify app is not installed, present the user with an App Store page
                showAppStoreInstall( )
            }
            self.playPauseButton.setImage(UIImage(named: "pause"), for: .normal)
        } else if self.updatePlayButton == "pause" { // playerState == nil ||
playerState!.isPaused
            startPlayback( )
            self.updatePlayButton = "play"
        } else {
            pausePlayback( )
            self.updatePlayButton = "pause"
        }
        // appRemote.authorizeAndPlayURI(songsListArray?.track_uri ?? "")
    }
}
@IBAction func action_search_Button(_ sender: Any) {
    guard Connectivity.isConnectedToInternet( ) else {
        showAlert("", message: "Internet not available", on View: self)
        return
    }
    self.viewModel.updateMusicType(input: self.musicType!)
    self.viewModel.connectionRequestForGetSearchList(withCompletion: { response,
error in
        if error == "")
            self.filterSongListArray.removeAll( )
            self.filterSongListArray = response
            if self.filterSongListArray.count > 0{
                self.msg_label.isHidden = true
                self.msg2_label.isHidden = true
            }else{
                self.msg_label.isHidden = false
                self.msg2_label.isHidden = false
                self.filterSongListArray.removeAll( )
            }
            self.flagArray.removeAllObjects( )
            for _ in response{
```

-continued

```
                    self.flagArray.add("0")
                    self.songFlat.add("0")
                }
                self.tblView.reloadData( )
            }else{
                showAlert("", message: "No Results", on View: self)
            }
        })
    }
fileprivate func fetchEpisodes( ) {
    guard let feedUrl = podcast?.feedUrl else { return }
    APIService.shared.fetchEpisodes(feedUrl: feedUrl) { [weak self] (episodes) in
        guard let 'self' = self else { return }
        self.episodes = episodes
        self.flagArray.removeAllObjects( )
        for _ in episodes{
            self.flagArray.add("0")
//          self.songFlat.add("0")
        }
        DispatchQueue.main.async {
            self.tableView.reloadData( )
        }
    }
}
fun methodForCheckSubscription( ){
    SKCloudServiceController( ).requestCapabilities{ (capability:SKCloudServiceCapability,
err:Error?) in
        guard err == nil else {
            print("error in capability check is \(err!)")
            if UserDefaults.standard.value(forKey: "apple") == nil{
                UserDefaults.standard.setValue("hello", forKey: "apple")
            }else{
                self.PermissionAlert(message: "Mix-Tape Would Like to Access Apple Music,
your music and video activity and your media library")
            }
            return
        }
        if capability.contains(SKCloudServiceCapability.musicCatalogPlayback) {
            print("user has Apple Music subscription")
        }
        if
capability.contains(SKCloudServiceCapability.musicCatalogSubscriptionEligible) {
            print("user does not have subscription")
            DispatchQueue.main.async {
                if let url = URL(string:
"https://itunes.apple.com/subscribe?app=music&at=1010134Vy&ct=app=music") {
                    if #available(iOS 10, *) {
                        UIApplication.shared.open(url, options: [:], completionHandler: nil)
                    } else {
                        UIApplication.shared.openURL(url)
                    }
                }
            }
        }
    }
}
```

Example Code 5

Figure 7:
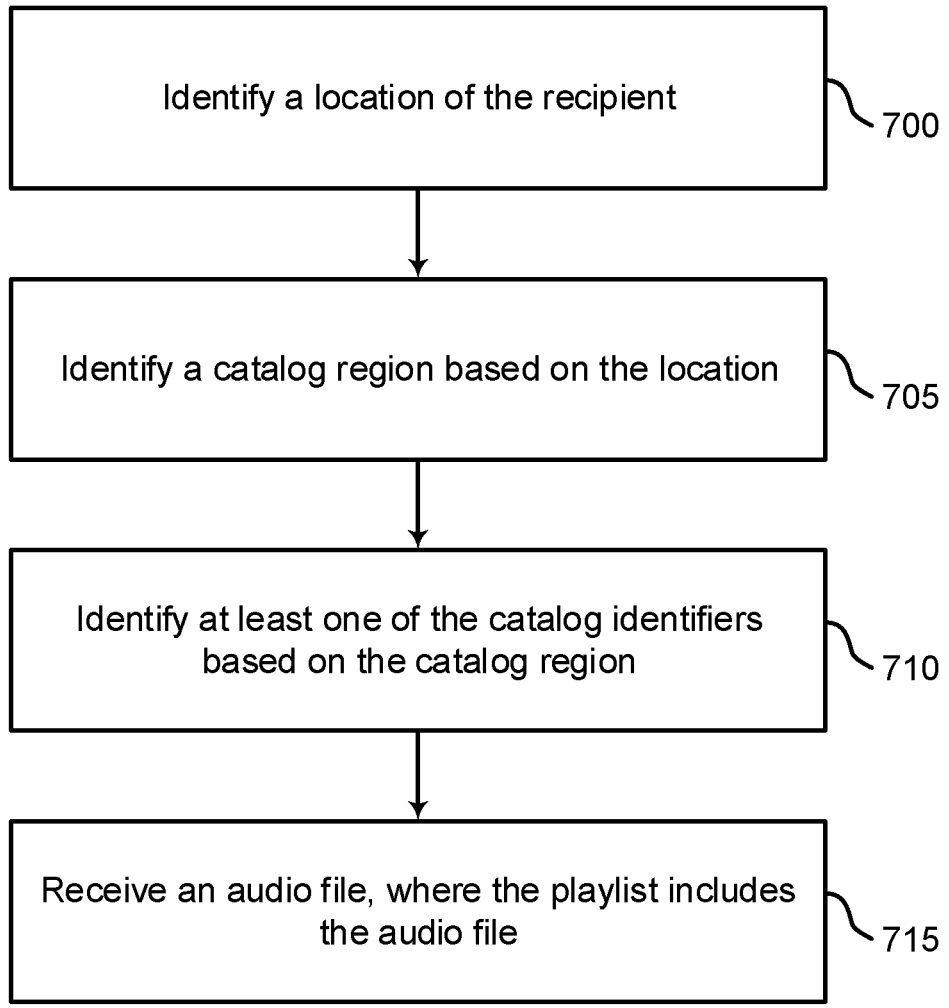
FIG. 7 shows an example of a process for receiving a playlist according to aspects of the present disclosure.

FIG. 7 shows an example of a process for receiving a playlist according to aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various sub-steps, or may be performed in conjunction with other operations described herein.

At operation 700, the system identifies a location of the recipient. In some cases, the operations of this step may refer to, or be performed by, a sharing component as described with reference to FIG. 2. The recipient is selected by the user.

At operation 705, the system identifies a catalog region based on the location of the recipient. In some cases, the operations of this step may refer to, or be performed by, a sharing component as described with reference to FIG. 2. The catalog region may be determined based on the user's physical location as described by the user's device, the location of the service provider, or a global positioning system (GPS)_location, if the recipient has location services turned on, but the present disclosure is not limited thereto.

At operation 710, the system identifies at least one of the catalog identifiers based on the catalog region. In some cases, the operations of this step may refer to, or be performed by, a sharing component as described with reference to FIG. 2. Additionally, the recipient's system may determine the correct catalog identifier based on the recipient's location.

At operation 715, the system receives an audio file, where the playlist includes the audio file. In some cases, the operations of this step may refer to, or be performed by, a receiving component as described with reference to FIG. 2. The user may choose to play the playlist or save the playlist.

Figure 8:
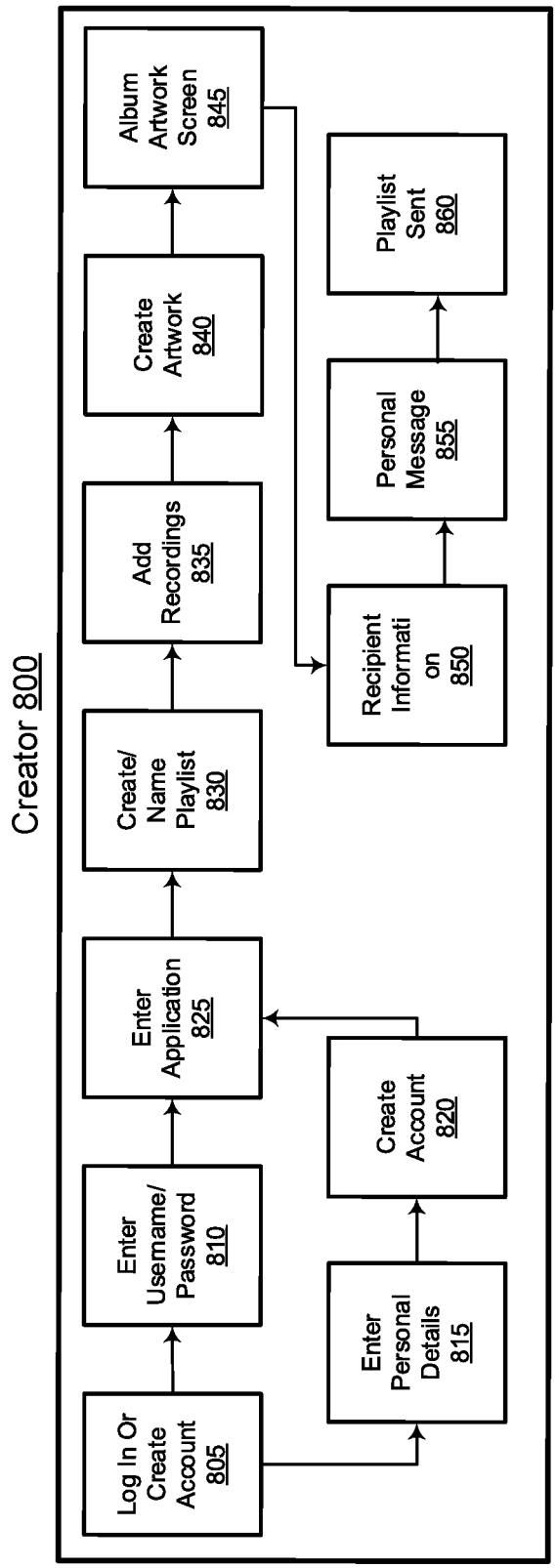
FIG. 8 shows an example of a creator interface according to aspects of the present disclosure.

FIG. 8 shows an example of a creator 800 interface according to aspects of the present disclosure.

Creator 800 may include log in or create account 820 805, enter username or password 810, enter personal details 815, create account 820, enter application 825, create or name playlist 830, add recordings 835, create artwork 840, album artwork screen 845, recipient contact information 850, personal message 855, and playlist sent 860.

In the creator 800, the user signs into the media sharing application using specified log-in credentials. To sign in, the user may input one of a username, email, media application identification, or a social media log in; along with a password. In a case where the user forgets a password, the user can regain his password by accessing a provided link to be sent to email ID for resetting the current password or on a registered media application device and phone number.

If the user does not have an account, the user may sign up with a username, email address, phone number, physical location, password, and a secondary confirmed password. Additionally, a user may sign up with social media login. For example, a user may sign up with Twitter, Facebook, or the like.

The user receives a one-time password (OTP), sent to the input email address. After the user is verified using the OTP, the user is redirected to the Home Screen.

From the home screen, the user can create a playlist. The user may name and edit the name of the playlist. A voice recorder may be used to record any audio to be saved to the playlist. An "add media" icon can be selected to select media to add to the playlist. The "add media" icon may be a "plus sign", custom image icon, or the like, but the present disclosure is not limited thereto. The number of media, types of media, and arrangement of media can be configured in this step. A "pay" icon and a pay option may also be present on the home screen. A user may also customize the artwork attached to a playlist. The user may take a picture, upload a picture, or write and draw on the artwork.

The playlist may then be sent to a recipient. A username, phone number, or email address is input in the UI to select another user. The user may also share the playlist using social media platforms. A personal message can be sent with the playlist.

Figure 9:
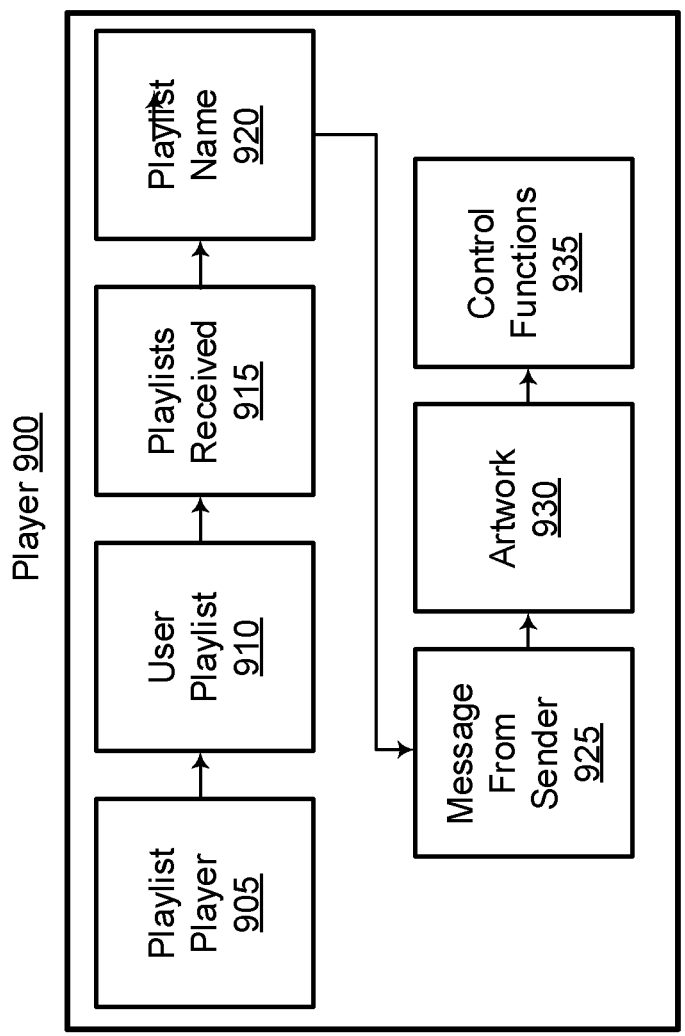
FIG. 9 shows an example of a player interface according to aspects of the present disclosure.

FIG. 9 shows an example of a player 900 interface according to aspects of the present disclosure.

Player 900 is the integrated media playing platform of the present disclosure. The player 900 may include a playlist player 905, user playlist 910, playlists received 915, playlist name 920, message-from-sender 925, artwork 930, and control functions 935.

A playlist player 905 may be an main screen used to display the user playlist 910, playlists received 915, playlist name 920, message-from-sender 925, artwork 930, and control functions 935. The user playlist 910 may be a playlist created by the user, either received or prior to being sent to another user. Playlists received 915 is a list of playlists received from another user. Playlist name 920 may be a name of the playlist. Message-from-sender 925 may be a text-style message of voice message received from another user. Control functions 935 may be the controls used to play, rewind, fast-forward, pause, skip, or restart a song. The control functions 935 is not limited to these controls.

Additionally, a user may also receive a playlist. The user receives a playlist, along with an optional recorded or text message, as well as any artwork the other user has input.

Figure 10:
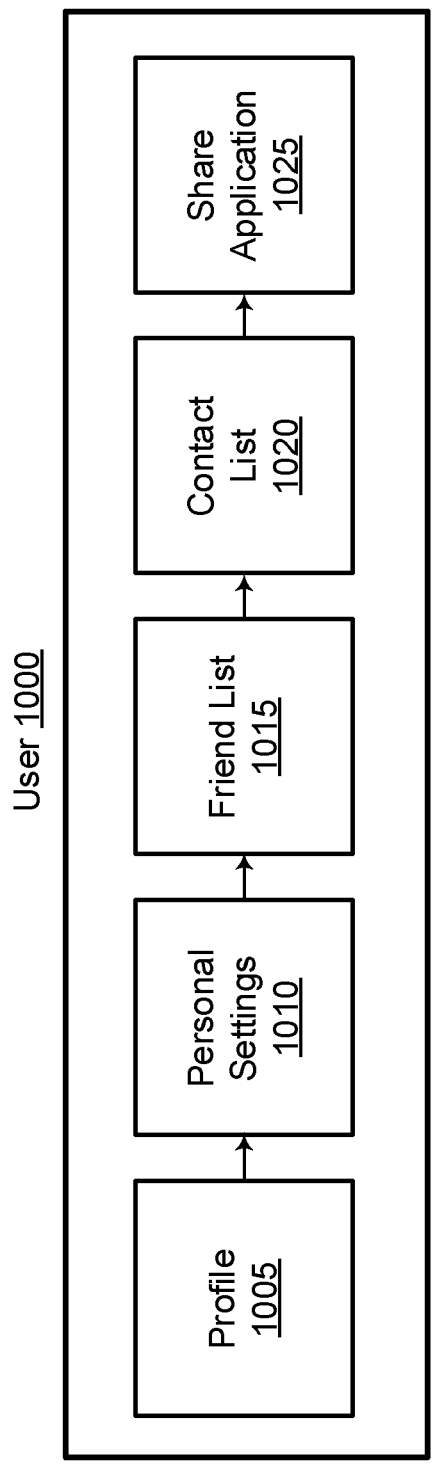
FIG. 10 shows an example of a user interface according to aspects of the present disclosure.

FIG. 10 shows an example of a user 1000 interface according to aspects of the present disclosure. User 1000 is a section of the UI used to control the personal settings of a user. The user 1000 may include a profile 1005, personal settings 1010, friend list 1015, contact list 1020, and share application 1025.

The profile 1005 is a viewable page for the user to see their own personal information. Personal settings 1010 may be used to adjust a user's settings and personal information. The friend list 1015 is a list of other users that the user has chosen to be connected to. Contact list 1020 may be a list of individuals that may or may not use the media sharing application. A user can invite other users based on their contact list. The share application 1025 is a function to share the application with other users. Sharing may be performed by text, email, or social media link.

In the media sharing application, the user may control a username, password, profile picture, phone number, email address, and sign-in information for social media account(s). In the application settings, a user may control notification settings, a user profile, media application sign in identifications, sharing settings, and account sharing settings.

A user-rating function is present in the UI. A user may rate the application, as well as send a message to predetermined developers. The UI has a privacy policy, user policy, terms and conditions, agreements, help center, cancel account option, fix-a-problem option, and call option. Additionally, there is an administrator (admin) panel. Admins may log-in to the application using a user ID and password. Admins can change the password at any time. A link to change the password is sent to the associated Email ID.

The admin can also select an icon to allow the platform to remember login credentials. Credentials are saved and are automatically auto-filled to the username and/or password box when the user signs in.

The admin dashboard provides user management options. The admin can manage all users and can view, delete, or block any other user. Additionally, the admin can manage media categories and can add and/or delete any category.

Creator management can be controlled by the admin, wherein the admin can check the playlist created by a user. Any sent or received songs can also be controlled or managed by the admin. The admin can perform payment management.

Report generation can be performed by the admin, creating statistical figures or charts. The admin can also perform notification management. The admin may control the occurrences, sound, or the like, of a notification but is not limited thereto. The admin may also manage static content present in the application.

Accordingly, the present disclosure includes the following embodiments.

A method for sharing media from a third-party media service is described. Embodiments of the method may generate a playlist comprising a plurality of media items and a catalog identifier corresponding to each of the media items, wherein each of the catalog identifiers corresponds to a third-party media application, transmitting the playlist to a recipient, and accessing one or more of the media items based on the corresponding catalog identifiers using firmware for the corresponding third-party media application.

An apparatus for media sharing is described. The apparatus may include a processor, memory in electronic communication with the processor, and instructions stored in the memory. The instructions may be operable to cause the processor to generate a playlist. The playlist may comprise a plurality of media items and a catalog identifier corresponding to each of the media items, wherein each of the catalog identifiers corresponds to a third-party media application, transmit the playlist to a recipient, and access one or more of the media items based on the corresponding catalog identifiers using firmware for the corresponding third-party media application.

A non-transitory computer-readable medium storing code for media sharing is described. In some examples, the code comprises instructions executable by a processor. The processor generates a playlist comprising a plurality of media items and a catalog identifier corresponding to each of the media items, wherein each of the catalog identifiers corresponds to a third-party media application, transmits the playlist to a recipient, and accesses one or more of the media items based on the corresponding catalog identifiers using firmware for the corresponding third-party media application.

Some examples of the method, apparatus, and non-transitory computer-readable medium described above may further include receiving input from a user identifying each of the media items, wherein the playlist is generated based on the input.

In some examples, the third-party media application corresponding to each of the catalog identifiers comprises a media application for a mobile electronic device, and the firmware comprises firmware for operating the third-party media application on the mobile electronic device.

Some examples of the method, apparatus, and non-transitory computer-readable medium described above may further include identifying a location of the recipient. Some examples may further include identifying a catalog region based on the location. Some examples may further include identifying at least one of the catalog identifiers based on the catalog region.

In some examples, the third-party media applications corresponding to the catalog identifiers comprise at least two third-party media applications.

In some examples, the plurality of media items comprise a music item, a video, an image, or any combination thereof.

Some examples of the method, apparatus, and non-transitory computer-readable medium described above may further include receiving an audio file, wherein the playlist comprises the audio file. Some examples may further include transmitting the audio file to the recipient along with the playlist.

Some examples of the method, apparatus, and non-transitory computer-readable medium described above may further include verifying that the recipient is authorized to access the one or more of the media items, wherein accessing the one or more of the media items is based at least in part on the verification.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application-specific integrated circuit (ASIC), a field-programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a web site, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for media sharing, comprising:
generating a playlist comprising a plurality of media items and catalog identifiers, a catalog identifier corresponding to each of the media items, and wherein at least one of the catalog identifiers corresponds to a third-party media application;
transmitting the playlist to a recipient;
connecting, from a media sharing application, to firmware on a mobile device that operates the third-party media application, wherein the firmware comprises instructions for operating a specific hardware used by the third-party media application and providing access to information used by the third-party media application; and playing, by the media sharing application, one or more of the media items based on corresponding catalog identifiers without directly connecting to the third-party media application by playing the one or more of the media items via the third-party media application using the firmware.

2. The method of claim 1, further comprising:
receiving input from a user identifying each of the media items, wherein the playlist is generated based on the input.

3. The method of claim 1, wherein:
the third-party media application corresponding to each of the catalog identifiers comprises a media application for a mobile electronic device.

4. The method of claim 1, further comprising:
identifying a location of the recipient;
identifying a catalog region based on the location;
identifying at least one of the catalog identifiers corresponding to the catalog region based on the location; and
bypassing a geography-specific restriction by homogenizing a first location and the location of the recipient by transmitting, independent of geographical proximity, the playlist and the one or more media item with the at least one of the catalog identifiers corresponding to the catalog region to the recipient, who is not authorized to receive the predetermined content, wherein the playlist is transmitted from a first region to the catalog region different from the first region, and wherein the one or more media items are played in the catalog region based on the at least one of the catalog identifiers corresponding to the catalog region.

5. The method of claim 1, wherein:
the third-party media applications corresponding to the catalog identifiers comprise at least two third-party media applications.

6. The method of claim 1, wherein:
the plurality of media items comprise a music item, a video, an image, or any combination thereof.

7. The method of claim 1, further comprising:
receiving an audio file, wherein the playlist comprises the audio file; and
transmitting the audio file to the recipient along with the playlist.

8. The method of claim 1, further comprising:
verifying that the recipient is authorized to play the one or more of the media items, wherein playing the one or more of the media items is based at least in part on the verification.

9. An apparatus for media sharing, comprising: a processor and a memory storing instructions and in electronic communication with the processor, the processor being configured to execute the instructions to:
generate a playlist comprising a plurality of media items and a catalog identifier corresponding to each of the media items, wherein each of the catalog identifiers corresponds to a third-party media application;
transmit the playlist to a recipient;
connect, from a media sharing application, to firmware on a mobile device that operates the third-party media application, wherein the firmware comprises instructions for operating a specific hardware used by the third party media application and providing access to information used by the third-party media application; and
play, by the media sharing application, one or more of the media items based on the corresponding catalog identifiers without directly connecting to the third-party media application by playing the one or more of the media items via the third-party media application using the firmware.

10. The apparatus of claim 9, the processor being further configured to execute the instructions to:
receive input from a user identifying each of the media items, wherein the playlist is generated based on the input.

11. The apparatus of claim 9, wherein:
the third-party media application corresponding to each of the catalog identifiers comprises a media application for a mobile electronic device, and the firmware comprises firmware for operating the third-party media application on the mobile electronic device.

12. The apparatus of claim 9, the processor being further configured to execute the instructions to:
identify a location of the recipient;
identify a catalog region based on the location;
identify at least one of the catalog identifiers based on the catalog region; and
bypassing a geography-specific restriction by homogenize a first location and the location of the recipient by transmitting, independent of geographical proximity, the playlist and the one or more media item with the at least one of the catalog identifiers corresponding to the catalog region to the recipient, who is not authorized to receive the predetermined content, wherein the playlist is transmitted from a first region to the catalog region different from the first region, and wherein the one or more media items are played in the catalog region based on the at least one of the catalog identifiers corresponding to the catalog region.

13. The apparatus of claim 9, the processor being further configured to execute the instructions to:
receive an audio file, wherein the playlist comprises the audio file; and
transmit the audio file to the recipient along with the playlist.

14. The apparatus of claim 9, the processor being further configured to execute the instructions to:
verify that the recipient is authorized to playing the one or more of the media items, wherein playing the one or more of the media items is based at least in part on the verification.

15. A non-transitory computer-readable medium storing code for media sharing, the code comprising instructions executable by a processor to:
generate a playlist comprising a plurality of media items;
identify a location of a recipient;
identify a catalog region based on the location; and
identify a catalog identifier corresponding to one or more of the media items based on the catalog region, wherein the catalog identifier corresponds to a third-party media application;
transmit the playlist to the recipient located in the catalog region;
connect, from a media sharing application, to firmware on a mobile device that operates the third-party media application, wherein the firmware comprises instructions for operating a specific hardware used by the third party media application and providing access to information used by the third-party media application; and
play, by the media sharing application, the one or more of the media items based on the corresponding catalog identifier and the catalog region by playing the one or more of the media items via the third-party media application using the firmware.

16. The non-transitory computer-readable medium of claim 15, the code further comprising instructions executable by the processor to:

receive input from a user identifying each of the media items, wherein the playlist is generated based on the input.

17. The non-transitory computer-readable medium of claim 15, wherein:

the third-party media application corresponding to each of the catalog identifiers comprises a media application for a mobile electronic device, and the firmware comprises firmware for operating the third-party media application on the mobile electronic device.

18. The non-transitory computer-readable medium of claim 15, the code further comprising instructions executable by the processor to:

receive an audio file, wherein the playlist comprises the audio file; and transmit the audio file to the recipient along with the playlist.

19. The non-transitory computer-readable medium of claim 15, the code further comprising instructions executable by the processor to:

verify that the recipient is authorized to play the one or more of the media items, wherein playing the one or more of the media items is based at least in part on the verification.

20. The non-transitory computer-readable medium of claim 15, wherein:

the one or more media items are played without directly connecting from a media sharing application that generates the playlist to the third-party media application.

* * * * *